Feb. 10, 1942.   P. F. EVERITT   2,272,604
COLLIMATING LENS AND OPTICAL SYSTEM
Filed Dec. 30, 1938

Inventor
Philip F. Everitt
by Wilkinson & Mawhinney
Attorneys.

Patented Feb. 10, 1942

2,272,604

UNITED STATES PATENT OFFICE 2,272,604

COLLIMATING LENS AND OPTICAL SYSTEM

Philip Francis Everitt, Ilford, England, assignor of two-thirds to Arthur Joseph Hughes, Chigwell Row, and Henry Hughes & Son, Limited, London, England, a corporation of Great Britain (jointly)

Application December 30, 1938, Serial No. 248,564
In Great Britain December 8, 1938

5 Claims. (Cl. 88—1)

This invention relates to collimating lenses suitable for use in instruments where light from a source or other object is required to pass through the lens, be reflected back on itself, again pass through the lens, and then be reflected in some other direction by a plane surface, the emergent beam to consist of parallel, or approximately parallel, rays.

The ordinary type of collimating lens, in which the rays pass through the lens only once, can be and is frequently designed to be corrected for chromatic aberration, spherical aberration, and coma, one type of construction in such cases being a cemented combination of certain well-known types of glass, one suitable pair being borosilicate crown glass, refractive index 1.4967 and dispersion .00765, with a lead silicate flint glass of refractive index 1.655; other suitable pairs are borosilicate crown with a lead silicate flint of different refractive indices, or heavy barium-silicate crown with lead silicate flint.

Another known types of construction is that in which the collimator consists of two uncemented lenses, but in these cases, if the lenses are to be close together, it is found that the simultaneous correction for chromatic aberration, spherical aberration and coma, is associated with the characteristic that the adjacent surfaces of the combination are necessarily of curvatures such that they will touch in the centre and cannot be made to touch at their edges.

When any of these combinations are used in such a way that the light diverging from the object to be collimated passes through the lens, is reflected back on itself, and is then reflected again in some other direction by a plane surface after traversing the lens twice in all, it is found that it is no longer possible to correct simultaneously for all the three aberrations above mentioned.

The object of this invention is to enable a collimating lens to be constructed which is free from the defects of chromatic aberration, spherical aberration and coma when used under the above conditions, and the invention is characterised by the fact that the two adjacent surfaces of a pair of component lenses are of such relative curvature that contact is made at the edge and not in the centre. One such collimating lens may be constructed from any ordinary glass pairs, and, when constructed from glasses having indices

| $nC$ | $nF$ |
|---|---|
| 1.51496 | 1.52353 |
| 1.59928 | 1.61522 | and of ¾" diameter, will have the following construction: the crown glass lens will be next the object and its first surface will be convex of radius 33.12 m. m. This lens will have a central thickness of 3.0 m. m. and a second convex surface of radius 191.4 m. m. In edge contact therewith will be the flint glass lens, the radius of its concave surface in edge contact with the 191.4 radius surface of the crown glass lens being 41.1 m. m. This flint glass lens can have a central thickness of 2.0 m. m. and an outer convex surface of radius 223.6 m. m.

This lens system should be placed at 1 m. m. distance from a plane reflecting surface which is perpendicular to the optical axis of the lens system. The rays are thus reflected back again through the same lens and can then be reflected in some other direction after passing through the lens by any suitable plane surface, and they are then parallel. The mean equivalent length of the whole system is 78.03 m. m. and it is corrected for chromatic and spherical aberration and coma.

The accompanying drawing illustrates the lens system above described and the optical system in which it is used, and in the drawing:

Fig. 1 shows the collimating lens, while

Figure 1:
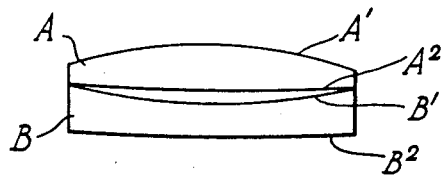

In Fig. 1, A indicates the front component of the collimating objective and is a double convex lens of crown glass and its front surface A' has a radius of curvature of 33.12 m. m., while its other surface A² is of 191.4 m. m. radius. The other component B is a concave-convex lens or divergent meniscus of flint glass with its surface B' of 41.1 m. m. radius in edge contact with the surface A² of the component A and the outer surface B² of the second component has a radius of curvature of 223.6 m. m.

Figure 2:
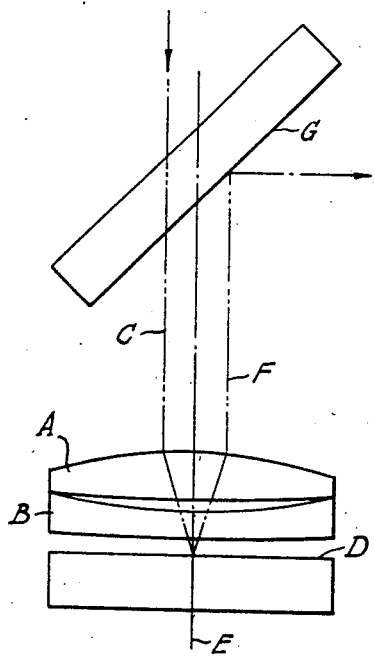
Fig. 2 is a diagram of the optical system incorporating the collimating lens shown in Fig. 1.

In the optical system incorporating the objective as shown in Fig. 2, an incident light ray, indicated at C, from the object to be collimated passes through the objective AB and is reflected back through the objective by a plane mirror surface D which is normal to the optical axis E of the objective. The emergent ray F impinges on a second plane reflecting surface G inclined to the optical axis and the light is thus reflected in some other direction H.

Variations in the exact type of glass used and also variations in the distance which the lens system is placed from the plane mirror perpendicular to the optical axis, as also the thicknesses of the lenses used, will affect the exact curvatures of the lenses as is well known.

An alternative form of the same design can be made in which the front component or outer lens is made of flint glass instead of crown glass, so that the order of the components is changed.

Figure 3:
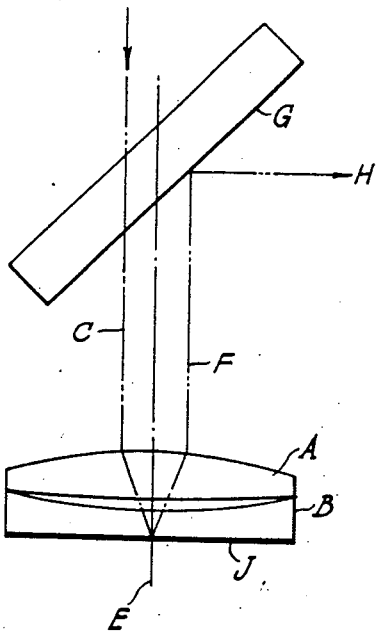
Fig. 3 is a diagram of a modified optical system.

By a suitable choice of the optical constants of the two glasses from which the component lenses are made, the rear surface of the back component lens B of Fig. 2 can be made plane and silvered and so utilised as the plane reflecting surface behind the combination in place of the separate plane mirror D in the optical system of Fig. 2. An arrangement of this kind is illustrated in Fig. 3 in which A and B are, as before, the two components of the collimating objective, A being a bi-convex lens and B a plano-concave lens with its concave face in edge contact with the lens A. The rear plane face of the lens B is silvered as indicated at J to form a totally reflecting mirror by which the incident ray C is reflected after refraction. As in Fig. 2, E indicates the optical axis and F is the emergent ray which is reflected to H by the inclined plane reflecting surface G.

What I claim as my invention and desire to secure by Letters Patent is:

1. In an optical system a compound collimating lens positioned to allow passage of incident light rays and comprising a two element lens, the lens element first transmitting the incident light being a double convex lens with surfaces of unequal curvature, the rear lens element being a concavo-convex lens, the surface of lesser curvature of said double convex lens being positioned adjacent the concave surface of the concavo-convex lens, said concave surface of the concavo-convex lens being of shorter radius of curvature than the adjacent surface of the double convex lens so that the lens elements can make contact only at the edges thereof and a plane mirror positioned behind said concavo-convex lens and normal to the optical axis of the compound lens to reflect the incident light transmitted thereto back through the said compound lens, said system being free from chromatic aberration, spherical aberration and coma.

2. In an optical system a compound collimating lens positioned to allow passage of incident light rays and comprising a two element lens, the lens element first transmitting the incident light being a double convex lens with surfaces of unequal curvature, the rear lens element being a plano-concave lens, the surface of lesser curvature of said double convex lens positioned adjacent the concave surface of the plano-concave lens, said concave surface of the plano-concave lens having a shorter radius of curvature than that of the adjacent surface of the double convex lens so that the lens elements can make contact only at the edges thereof, the plane surface of the plano-concave lens being silvered to reflect incident light transmitted thereto and to reflect said light back through the compound lens thereby causing collimation of the reflected light, said optical system being free from chromatic aberration, spherical aberration and coma.

3. In an optical system, the combination of a compound collimating lens and a plane mirror, said compound lens comprising two lens elements having their adjacent surfaces of unequal curvatures such that the elements make contact only at the edges thereof with an intervening space in the center, the surfaces of the lens elements being shaped to converge incident light, said mirror being disposed to reflect the said convergent light back through the lens, said optical system being free from chromatic aberration, spherical aberration and coma.

4. In an optical system a compound collimating lens comprising a two element lens, said lens elements having adjacent surfaces of unequal curvatures such that the lens elements make contact only at the edges thereof with an intervening space in the center, the surfaces of the lens elements being shaped to converge incident light, the rear surface of the compound lens being silvered to reflect the convergent light back through the lens, said optical system being free from chromatic aberration, spherical aberration and coma.

5. An optical system free from chromatic aberration, spherical aberration and coma, comprising a double convex lens, a concavo-convex lens and a plane reflecting surface in which the double convex lens has the characteristics of a crown glass lens having a central thickness of about 3.0 m. m., curvatures of about 33.12 m. m. and 191.4 m. m. radius and the concavo-convex lens has the characteristics of a flint glass lens having a central thickness of about 2.0 m. m., a concave curvature of about 41.4 m. m. radius and a convex curvature of about 223.6 m. m. radius, said concave surface of said concavo-convex lens being adjacent to the surface of greater curvature of said double convex lens with said lenses substantially in edge engagement and said reflecting surface being adjacent to the convex surface of said concavo-convex lens.

PHILIP FRANCIS EVERITT.